United States Patent [19]

Sakai et al.

[11] 4,009,692
[45] Mar. 1, 1977

[54] TORCH-IGNITION RECIPROCATING INTERNAL COMBUSTION ENGINE

[75] Inventors: Yasuo Sakai, Yokohama; Yasuhiko Nakagawa, Fujisawa, both of Japan

[73] Assignee: Nissan Motor Co., Ltd., Yokohama, Japan

[22] Filed: Nov. 15, 1974

[21] Appl. No.: 524,319

[30] Foreign Application Priority Data

Nov. 20, 1973 Japan .............................. 48-130382

[52] U.S. Cl. .............................. 123/32 SP; 123/75 B
[51] Int. Cl.² .................... F02B 19/10; F02B 19/16
[58] Field of Search .......... 123/32 ST, 32 SP, 75 B, 123/191 S, 191 SP

[56] References Cited

UNITED STATES PATENTS

| | | | |
|---|---|---|---|
| 3,092,088 | 6/1963 | Goossak | 123/325 P |
| 3,508,530 | 4/1970 | Clawson | 123/325 P |
| 3,776,212 | 12/1973 | Karlowitz | 123/325 P |
| 3,830,205 | 8/1974 | Date | 123/325 P |
| 3,853,097 | 12/1974 | Kume | 123/325 P |

*Primary Examiner*—Ronald B. Cox

[57] ABSTRACT

An internal combustion engine comprises a main combustion chamber defined on one side by a piston and also having an auxiliary combustion chamber connected by a torch flame passageway to the main combustion chamber. The ratio of cross sectional area cut through the torch flame passageway at right angles thereto to the volume of the auxiliary combustion chamber being from a value that is greater than 0.2cm²/cc to 0.3cm²/cc. The volume of the auxiliary combustion chamber is from 6 percent to 15 percent of the total clearance volume that is the combined volume including a volume of the auxiliary combustion chamber, a volume of the main combustion chamber at the top dead center position of the piston and a volume of the torch flame passageway.

1 Claim, 10 Drawing Figures

TORCH-IGNITION RECIPROCATING INTERNAL COMBUSTION ENGINE

The present invention relates to a torch-ignition reciprocating internal combustion engine.

Torch-ignition reciprocating internal combustion engines are provided, in addition being provided with a main combustion chamber between a cylinder head and a piston in a cylinder, with a prechamber or auxiliary combustion chamber fed with fuel-rich mixture (that is, fuel-air mixture richer than that fed to the main chamber). Main inlet channel or intake valve for the main combustion chamber is constructed and arranged such as to impart rotation to inflowing fuel-lean mixture, whereby swirling flow of fuel-lean mixture about the cylinder axis results. The prechamber which is formed in the cylinder head is communicated with the main chamber through a passageway. A spark plug is placed in the prechamber to initiate combustion of fuel-rich mixture therein. Combustion product, as a torch flame, spouts into the main combustion chamber through the passageway to ignite fuel-lean mixture swirling in the cylinder.

The engines constructed as aforementioned, if properly designed, would operate with low levels of hydrocarbon and carbon monoxide emissions. Inquiry thus has been made by the inventors of the present invention to determine what design parameters have a substantial effect on hydrocarbon and carbon monoxide emissions and specific fuel consumption of the engine described above. It has been recognized from the results of a series of tests on the engine that a ratio of the prechamber volume to the total clearance volume (that is, the combined volume including a prechamber volume, a main combustion chamber volume at TDC and a volume of a passageway interconnecting the prechamber and the main chamber); a ratio of a cross sectional area cut through the passageway at right angles thereto to the prechamber volume; a length to diameter ratio of the passageway; and an angle (Z) between an axial plane in which the passageway is arranged and an axial plane extending between the cylinder axis and the inlet end of the passageway have a substantial effect on hydrocarbon and carbon monoxide emissions and specific fuel consumption of the engine.

The present invention aims above all to utilize the aforementioned recognition for the purpose of such combustion arrangement of the type of internal combustion engine described above, that low levels of hydrocarbon and carbon monoxide emissions and small fuel consumption result.

It has been experimentally confirmed by the inventors that selecting the ratio of the prechamber volume to the total clearance volume between 6 and 15%, the ratio of a cross sectional area cut through the passageway at right angles thereto to the prechamber volume between 0.07 cm$^2$/cc and 0.3 cm$^2$/cc, a length to diameter ratio of the passageway between 0.5 and 3.0 and the angle Z not greater than 60° in the direction of swirling flow of lean mixture and 15° opposite the direction of the flow always cause low levels of hydrocarbon and carbon monoxide emissions and good fuel economy.

The variation of the ratio of the prechamber volume to the total clearance volume is found to depend on the variation of the engine displacement volume per cylinder. As the engine displacement volume per cylinder increases the optimum ratio of the prechamber volume to the total clearance volume decreases. With an engine having a displacement volume per cylinder not less than 500cc, 6% or a value near 6% was found optimum, and with an engine having a displacement per cylinder not above 400cc, 15% or a value near 15% optimum. Only test results of an engine having a displacement volume per cylinder between 400cc and 500cc is illustrated in a graph (see FIG. 3), which graph shows 10% is optimum because hydrocarbon and carbon monoxide emissions are lowest as well as the best fuel economy is also obtained.

Four different configurations of passageway were evaluated (diagrammatically shown in FIGS. 7A to 7D) including a cylindrical bore (shown in FIG. 7A) and it has been found that the four configurations evaluated have the same effect on hydrocarbon and carbon monoxide emissions and on specific fuel consumption. Hence, the cylindrical bore was selected taking into account its ease of manufacture compared with the other three configurations and the optimum ratio of a cross sectional area cut through a passageway at right angles thereto to the prechamber volume was determined by tests on various cylindrical bores. The results are illustrated in a graph (see FIG. 4). The graph shows that hydrocarbon and carbon monoxide exhaust emissions and specific fuel consumption are lowest in the 0.07 – 3.0 cm$^2$/cc range.

During the test it was found that the ratio of the prechamber volume to the total clearance volume and the ratio of a cross sectional area cut through the passageway at right angles thereto to the prechamber volume are not decisive parameters since selecting the above-mentioned two ratios within their determined optimum ranges respectively does not always cause lower levels of hydrocarbon and carbon monoxide emissions as well as fuel economy.

Thus, a length to diameter ratio, that is L/D (see FIG. 5), of a passageway and an angle Z, between an axial plane in which a torch flame spouts and an axial plane extending between a cylinder axis and the inlet end of a passageway, were tested, the results being shown in graphs (see FIGS. 5 and 6). It was confirmed that a lower level of specific fuel consumption is obtained when the ratio L/D is within the range between 0.5 to 3.0 and lower level of hydrocarbon emission is obtained when the angle Z is within the angular range between 60° in the direction of swirling of the inflowing lean mixture in the cylinder to 15° opposite the direction of swirling of the inflowing lean mixture in the main combustion chamber.

Accordingly, it is an object of the present invention to provide a torch-ignition reciprocating internal combustion engine constructed as described above, which assures a particularly favourable combustion within a cylinder accompanied with relatively low levels of hydrocarbon and carbon monoxide exhaust emissions and relatively low fuel consumption.

The present invention will become more apparent from the following description, read in conjunction with the accompanying drawings, in which.

Figure 1:
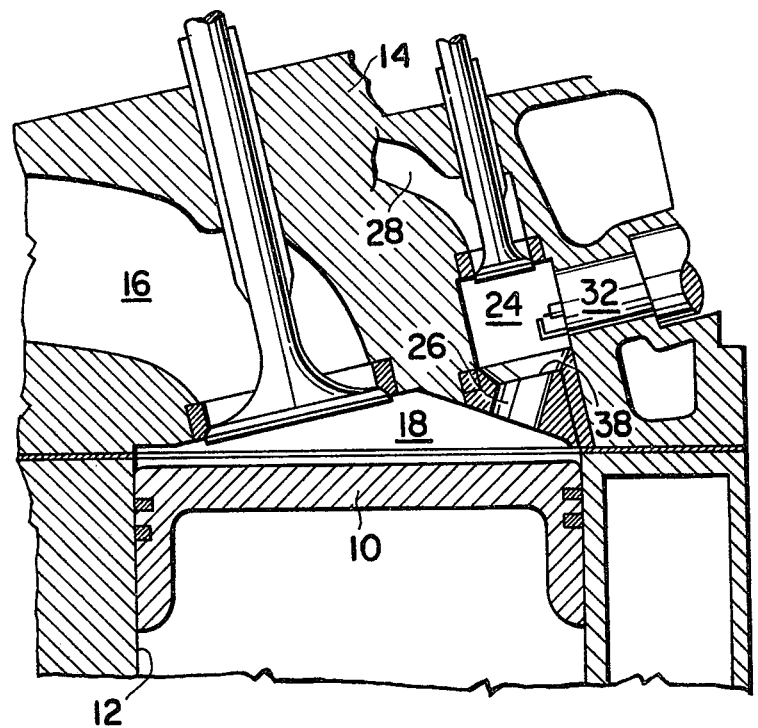
FIG. 1 is a partial axial cross-sectional view through a cylinder of a torch-ignition reciprocating internal combustion engine according to the present invention and illustrating the arrangement of a main combustion chamber and a prechamber communicating with the main combustion chamber through a passageway.
Figure 2:
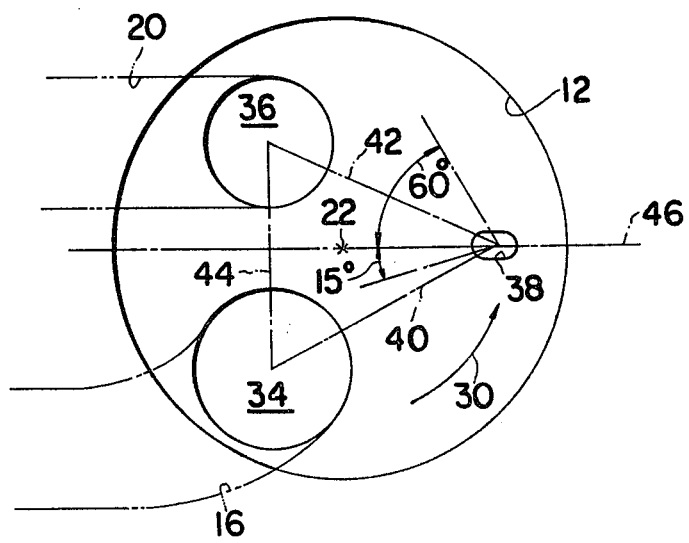
FIG. 2 is a top plan view of a piston and illustrating the arrangement of an inlet port, an exhaust port and a spout of the engine shown in FIG. 1.
Figure 3:
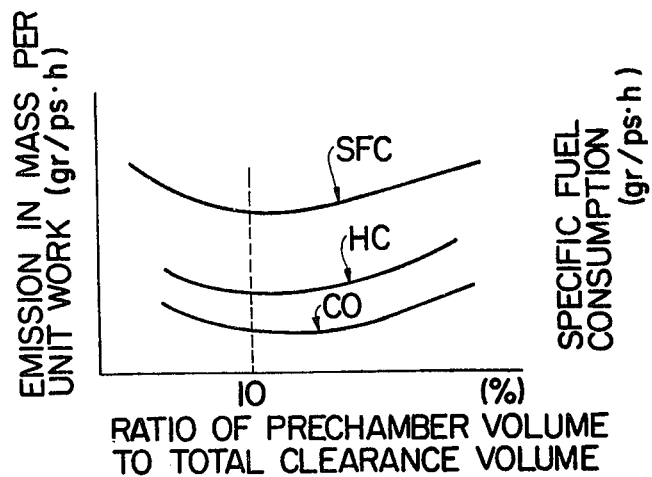
FIG. 3 is a graph of test results of hydrocarbon and carbon monoxide emission as well as specific fuel consumption versus a ratio of prechamber volume to the total clearance volume, showing the effect of variation of the ratio on hydrocarbon and carbon monoxide emissions and specific fuel consumption.
Figure 4:
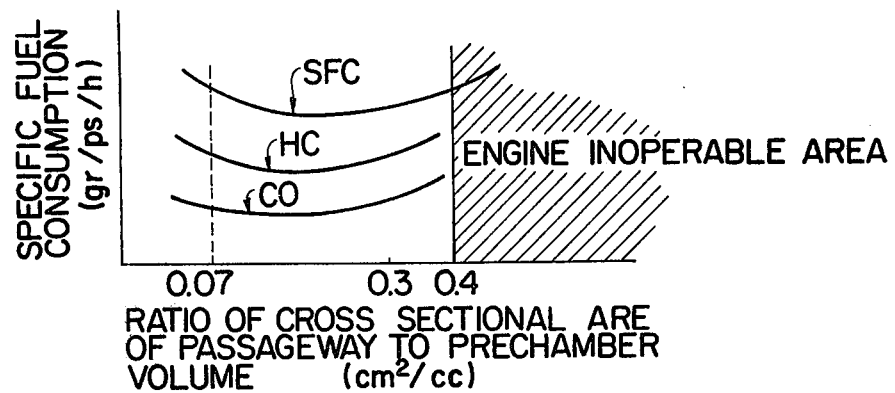
FIG. 4 is a graph of test results of hydrocarbon and carbon monoxide emissions as well as specific fuel consumption versus a ratio of a cross-sectional area cut through a passageway at right angles thereto to prechamber volume, showing the effect of variation of the ratio on hydrocarbon and carbon monoxide emissions and specific fuel consumption.

Referring now to FIGS. 1 and 2 of the accompanying drawings wherein like reference numerals are used throughout the two views to designate like parts, a torch-ignition reciprocating internal combustion engine is illustrated in these two figures. A piston 10, reciprocatingly driven in a conventional manner (not illustrated), is arranged in a cylinder 12 of the engine, while the cylinder 12 is closed off by a cylinder head 14, in which are located a valve controlled main inlet channel 16 leading to a main combustion chamber 18 to feed fuel-lean mixture to the main combustion chamber 18 between the cylinder head 14 and the piston 10 and a valve controlled exhaust channel 20 also leading to the main combustion chamber 18. The main inlet channel 16 is constructed as a swirl channel to impart swirling to the inflowing fuel-lean mixture as it enters the cylinder 12, whereby the swirling flow in the direction of arrow 30 (see FIG. 2) of lean mixture about the cylinder axis 22 is maintained during the compression stroke of the piston 10. FIG. 1 illustrates the positions of parts of the engine when the piston 10 is at the TDC.

A prechamber 24, a passageway 26 interconnecting the prechamber 24 and the main chamber 18, and a valve controlled auxiliary inlet channel 28 leading to the prechamber to feed fuel-rich mixture thereto are located in the cylinder head 14.

The engine is constructed as a mixture intaking engine whereby fuel-lean mixture, which is not ignitable by a spark, and rich mixture, which is ignitable by a spark, are sucked during the suction stroke of the piston 10 into the main combustion chamber 18 and into the prechamber 24 through the main inlet channel 16 and the auxiliary inlet channel 28, respectively. A spark plug 32 is fixed or placed in the prechamber 24 to ignite fuel-rich mixture fed thereto.

The construction of the engine as aforedescribed is conventional and well known, thus precise description of operation of the engine is omitted for the sake of simplicity of the description.

Figure 5:
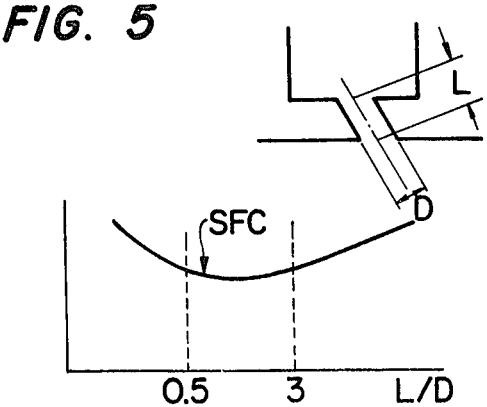
FIG. 5 is a graph showing the effect of variation of L/D on specific fuel consumption.
Figure 6:
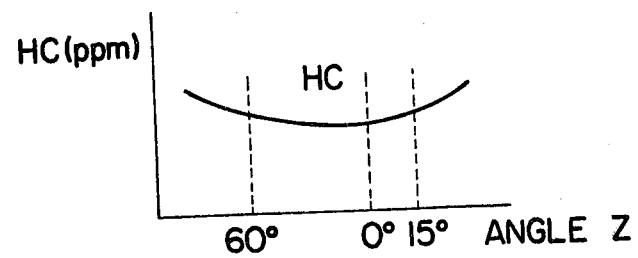
FIG. 6 is a graph showing the effect of changing an angle Z on hydrocarbon emission.
Figure 7A:
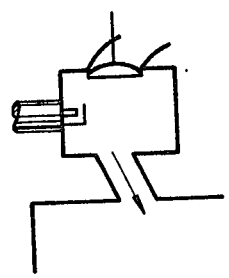
FIGS. 7A–7D are diagrams showing four different passageway configurations evaluated.
Figure 7C:
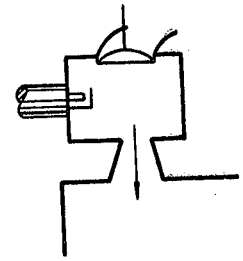
Figure 7B:
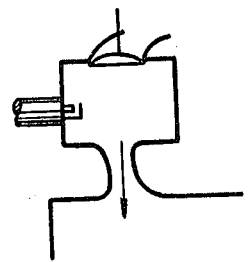
Figure 7D:
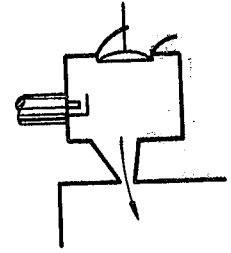

As best seen in FIG. 2 the most preferred arrangement of the inlet port 34 of the main inlet channel 16, exhaust port 36 of the exhaust channel 20 and spout 38 of the passageway 26 is such that the cylinder axis 22 falls within an triangle (as viewed in FIG. 2) formed of lines 40, 42, 44 linking the centers of the inlet port, exhaust port and the spout. In the engine constructed as described above, the volume of the prechamber 24 is 6 – 15% of the total clearance volume, the passageway 26 is a cylindrical bore and the ratio of cross sectional area cut through the passageway at right angles thereto to the prechamber volume is between 0.07 cm²/cc and 0.3 cm²/cc and length (L) to diameter (D) ratio of the passageway 26, that is L/D (see FIG. 5) is between 0.5 and 3.0. The passageway 26 is arranged in an axial plane which is displaced from an axial plane 46 extending between the cylinder axis 22 and the center of the inlet end 38, by an angle not greater than 60° in the direction of swirling flow of lean mixture and 15° opposite the direction of swirling flow.

What is claimed is:

1. An internal combustion engine comprising: a cylinder head; a cylinder closed off by the cylinder head; a piston movable within the cylinder between the top dead center and the bottom dead center; a main combustion chamber formed in the cylinder between the piston and the cylinder head; an auxiliary combustion chamber; a torch flame passageway establishing communication between the main and auxiliary combustion chambers; means for introducing a relatively lean mixture into said main combustion chamber, the relatively lean mixture introducing means being so constructed and arranged as to impart rotation to inflowing relatively lean mixture as it enters the main combustion chamber to cause the rotation flow of lean mixture about the cylinder axis; means for initiating combustion in the auxiliary combustion chamber; the volume of the auxiliary combustion chamber being from 6 percent to 15 percent of the total clearance volume that is the combined volume including a volume of the auxiliary combustion chamber, a volume of the main combustion chamber at the top dead center position of the piston and a volume of the torch flame passageway; a ratio of cross sectional area cut through the torch flame passageway at right angles thereto to the volume of the auxiliary combustion chamber being from 0.07cm²/cc to 0.3cm²/cc; a length to diameter ratio of the torch flame passageway being from 0.5 to 3.0; and the torch flame passageway being arranged in an axial plane which is parallel to the cylinder axis and includes the inlet end of the torch flame passageway and which is displaced from an axial plane including the cylinder axis and the inlet end of the torch flame passageway by an angle not greater than 60°, as measured from the second mentioned axial plane to the first mentioned axial plane in the direction of the rotating flow of lean mixture passing through the second mentioned plane within an area adjacent to the inlet end of said torch flame passageway and 15°, as measured from the second mentioned axial plane to the first mentioned axial plane in a direction opposite the direction of the rotating flow of lean mixture passing through the second mentioned plane within an area adjacent to the inlet end of the torch flame passageway and as measured with the inlet of the torch flame passageway as the center of measurement.

* * * * *